US006886168B2

(12) United States Patent
Callaway et al.

(10) Patent No.: US 6,886,168 B2
(45) Date of Patent: Apr. 26, 2005

(54) METHOD AND SYSTEM FOR EXTENSIBLE DATA PROCESSING

(75) Inventors: W. Scott Callaway, San Diego, CA (US); Edward A. Hunter, San Diego, CA (US)

(73) Assignee: Q3DM, LLC, San Diego, CA (US)

( * ) Notice: Subject to any disclaimer, the term of this patent is extended or adjusted under 35 U.S.C. 154(b) by 675 days.

(21) Appl. No.: 09/766,390

(22) Filed: Jan. 19, 2001

(65) Prior Publication Data

US 2001/0033299 A1 Oct. 25, 2001

Related U.S. Application Data

(60) Provisional application No. 60/177,111, filed on Jan. 20, 2000.

(51) Int. Cl.[7] .................................................. G06F 9/44
(52) U.S. Cl. ...................................... 719/316; 382/128
(58) Field of Search ................................ 719/310–320; 382/128–134

(56) References Cited

U.S. PATENT DOCUMENTS

| 5,313,575 | A |   | 5/1994 | Beethe |         |
|-----------|---|---|--------|--------|---------|
| 5,504,917 | A |   | 4/1996 | Austin |         |
| 5,631,974 | A | * | 5/1997 | Lau-Kee et al. | 382/132 |
| 6,011,919 | A | * | 1/2000 | Politis et al. | 717/114 |
| 6,557,017 | B1 | * | 4/2003 | Venable | 715/502 |

OTHER PUBLICATIONS

Halse, M.A. et al, "Release 2 Manual", Iris Explorer User's Guide, 'Online! Xp002171282 URL:http://www/gatech.edu/scivis/iris/doc/ug/front.html, 1997.
Khoral Research: "Khoros Manual", Advanced Khoros Manuals, 'Online! Jan. 1, 1997, XP002171281 URL:http://www/ee/byu.edu/support/khoros2.2/topmost_toc.html.
Wang, R., "Interactive Visualization And Programming—A 3D Vector Field Visualization System", IEEE Trans Magnetics, vol. 29, No. 2, 1, Mrch 1993 XP00217283.
International Search Report for PCT/US101/01928, Jul. 24, 2001.

* cited by examiner

Primary Examiner—St. John Courtenay, III
(74) Attorney, Agent, or Firm—DLA Piper Rudnick Gray Cary US LLP

(57) ABSTRACT

A system and method of assembling an application for processing image or image-derived data is disclosed. The system includes a base operator configured to interface with one or more derivative operator classes, each operator class including an operator object for executing a processing function on the image or image-derived data. A base multiport node class is provided, which is configured to provide a multiport node for each operator object. The multiport nodes instantiates a pluggable operator for connecting the multiport nodes together at runtime according to user-defined parameters. The connection of multiport nodes implements the processing functions of the operator objects to execute the application.

20 Claims, 6 Drawing Sheets

METHOD AND SYSTEM FOR EXTENSIBLE DATA PROCESSING

RELATED APPLICATION

This application claims the benefit of U.S. Provisional Application No. 60/177,111, filed Jan. 20, 2000 and entitled "A Software Framework for Scanning Cytometry," which is incorporated herein in its entirety.

BACKGROUND OF THE INVENTION

1. Field of the Invention

The invention relates generally to images of specimens. In particular, the invention relates to extendable image processing architectures.

2. Description of the Related Art

An image of a biological specimen can be a useful tool in diagnosing a variety of pathological conditions. For instance, images of biological specimens can reveal cells in the process of dividing. Since cancer is characterized by rapidly dividing cells, an image showing an unusually large number of cells dividing can indicate the presence of cancerous cells.

Various image processing operations can be performed on the images or image-derived data. For instance, one operation can be a filter that selectively generates a processed image according to filtering criteria, such as selecting a particular type of specimen within an image. The processed image could then be presented to another processing operation, such as a threshold operation that renders a new processed image of specimen images that exceed a particular defined threshold.

The number and types of image processing operations can change over time, and vary with respect to a desired application. In order to change the image processing operations, or change parameters of particular processing operations, a change is usually required to the image processing software code which requires completely recompiling the code with the changes. Further, conventional systems do not allow parametric changes on the fly during runtime of an application without stopping the application and/or needing to recompile the application code. For the above reasons, there is a need for a system and method for customizing an image processing platform, which supports the ability to be dynamically defined during run time of the image processing operations.

SUMMARY OF THE INVENTION

The invention relates to a architecture for a customizable image processing platform. In one embodiment of the invention, a system for assembling an application for processing image or image-derived data includes a base operator configured to interface with one or more derivative operator classes, each operator class including an operator object for executing a processing function on the image or image-derived data. The system according to the embodiment further includes a base multiport node class configured to provide a multiport node object for each operator object. The multiport node objects instantiate a pluggable operator for connecting the multiport node objects together at runtime according to user-defined parameters, and wherein the connection of multiport node objects implements the processing functions of the operator objects to execute the application.

In accordance with another embodiment, a method of assembling an application for processing image or image-derived data includes providing a base operator having an interface for interacting with one or more derivative operator classes, each operator class including an operator object for executing a processing function on the image or image-derived data. The method further includes providing a base multiport node configured to provide a multiport node for each interacting operator object, and connecting the multiport nodes with a pluggable operator instantiated by the multiport nodes.

DETAILED DESCRIPTION OF THE PREFERRED EMBODIMENTS

Figure 1:
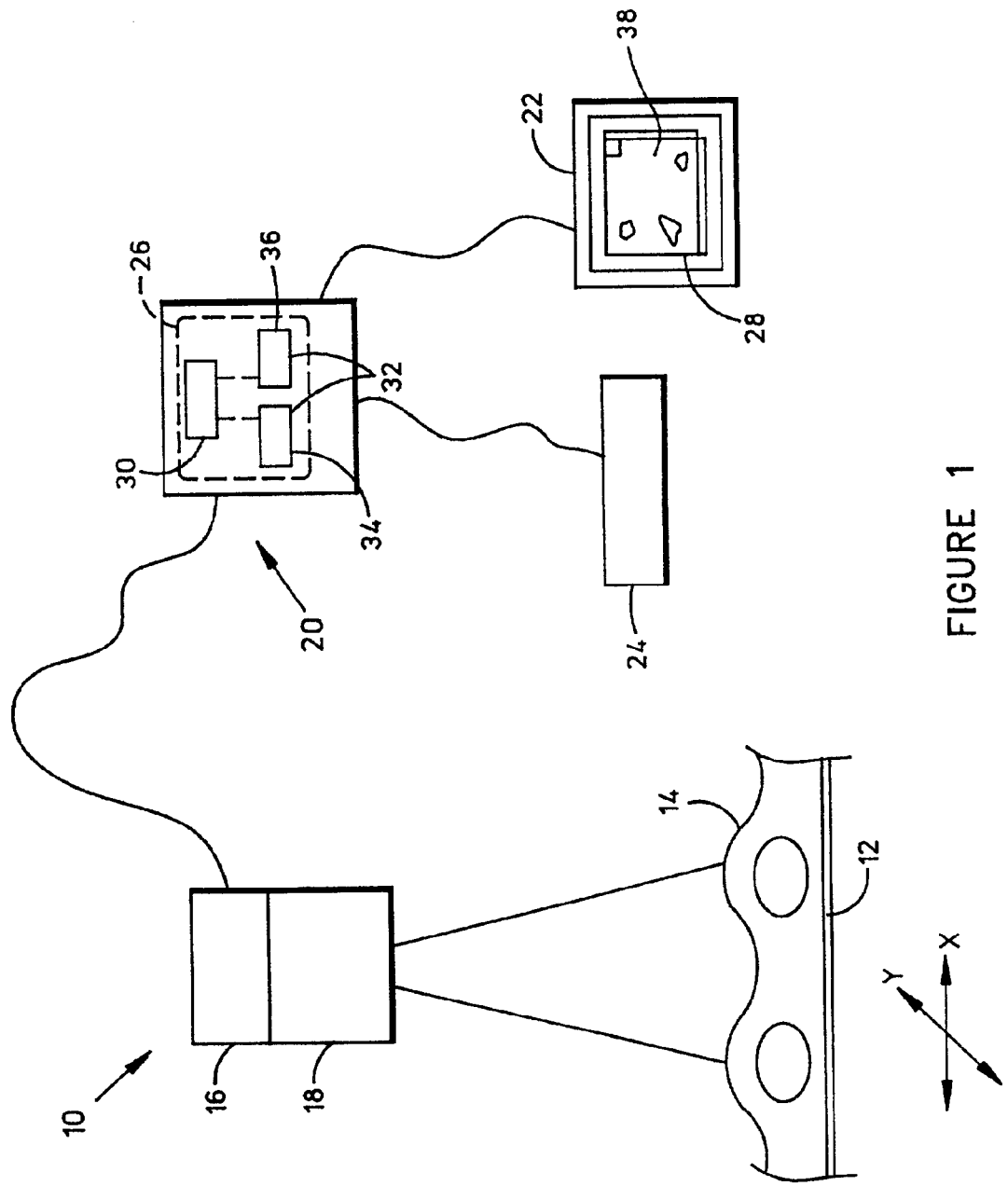
FIG. 1 illustrates a system for imaging a biological specimen.

FIG. 1 illustrates a system 10 for imaging and/or viewing of a specimen 14. The system 10 includes a stage 12 where a specimen 14 can be positioned. An imaging device 16 views the specimen 14 through an optics assembly 18. The imaging device 16 is configured to generate an image of the specimen 14 and can be moved relative to the specimen 14. Moving the imaging device 16 relative to the stage 12 can include moving the stage 12 while holding the imaging device 16 stationary or moving the imaging device 16 while holding the stage 12 stationary. As a result, the imaging device 16 can be moved so it views different regions of the specimen 14. The imaging device 16 can then generate an image of each of these different regions. Suitable imaging devices 16 include, but are not limited to, area cameras. The optics assembly 18 controls the focal plane of the imaging device 16 such that the imaging device 16 is focused on a surface of the specimen 14 of at a particular depth within the specimen 14.

The system 10 also includes a processing unit 20 in communication with the imaging device 16, a display 22 and one or more user interfaces 24. The processing unit 20 houses electronics 26 for controlling various operations of the system 10. For instance, the electronics 26 can control movement of the imaging device 16 relative to the specimen 14. The display 22 can be used to show at least a portion of one or more specimen images 38 which have been generated by the system 10. The displayed image is visible to an operator in a display area. The display 22 can also be used to indicate a variety of system 10 conditions to the operator.

An operator can use the one or more user interfaces 24 to interact with the system 10 and vary system parameters. For instance, an operator can use a user interface to manipulate the display area 28. The operator can change the portion of a specimen image 38 which is visible by scrolling to a new portion of the specimen image 38, zooming in and/or zooming out on the specimen image 38. A suitable user interface includes, but is not limited to, a keyboard and a mouse. Although a single processing unit 20, one or more user interfaces 24 and display 22 are illustrated, the system 10 can include a plurality of processing units 20, displays 22 and user interfaces 24.

The electronics 26 can include one or more processors 30 for performing instructions stored or carried on a machine readable medium 32. Suitable processors 30 include, but are not limited to, programmed general purpose digital computers, microprocessors, digital signal processors (DSP), integrated circuits, application specific integrated circuits (ASICs), logic gate arrays and switching arrays.

The one or more processors 30 are in communication with one or more working memories 34 and one or more storage memories 36. Suitable working memories 34 include, but are not limited to, volatile memories such as RAM and other memories from which a processor primarily works during execution of instructions. Suitable storage memories 36 include, but are not limited to, non-volatile memories such as a disk drive.

The working memory and/or the storage device are examples of or contain machine readable media which store data developed during operation of the system 10 and/or instructions to be executed by the one or more processors 30. Other machine readable media which can serve as the working memory and/or the storage device include, but are not limited to, optical discs such as a compact disk (CD), CD-ROM, CD-R (a recordable CD-ROM that can be read on a CD-ROM drive), CD-RW (multiple-write CD), CD-E (recordable and erasable CD), or DVD (digital video disc). Alternatively, instead of, or in addition to an optical disc, the machine readable media can include one or more of the following: a magnetic data storage diskette (floppy disk), a Zip disk, DASD storage (e.g., a conventional "hard drive" or a RAID array), magnetic tape, RAM, electronic read-only memory (e.g., ROM, EPROM, or EEPROM), paper punch cards, or transmission media such as digital and/or analog communication links.

In some instances, one or more of the machine readable media are positioned outside or remote from the processing unit 20. For instance, the machine readable medium 32 may be part of, or may be connected to, a server computer that is connected to a network, in order to make the machine-readable code available to other computers. The network may be a local area network (LAN), a wide area network (WAN), or any other type of network. This arrangement enables one or more other computers connected to the network to copy instructions and/or data from the machine readable medium 32 that is part of, or connected to, the (server) computer, to a machine readable medium 32 that is part of, or connected to, the processing unit 20. This may be accomplished, for example, by connecting computers from one or more networks, over the Internet.

In other instances, the machine readable medium 32 may be part of, or may be connected to, a computer that is operating a bulletin board system 10 (BBS), which can be accessed by other computers. This arrangement enables the processing unit 20 to connect to the BBS and copy the instructions and/or data from the machine readable medium 32 that is part of, or connected to, the computer that is operating the BBS, to the machine readable medium 32 in communication with the processing unit 20.

Figure 2:
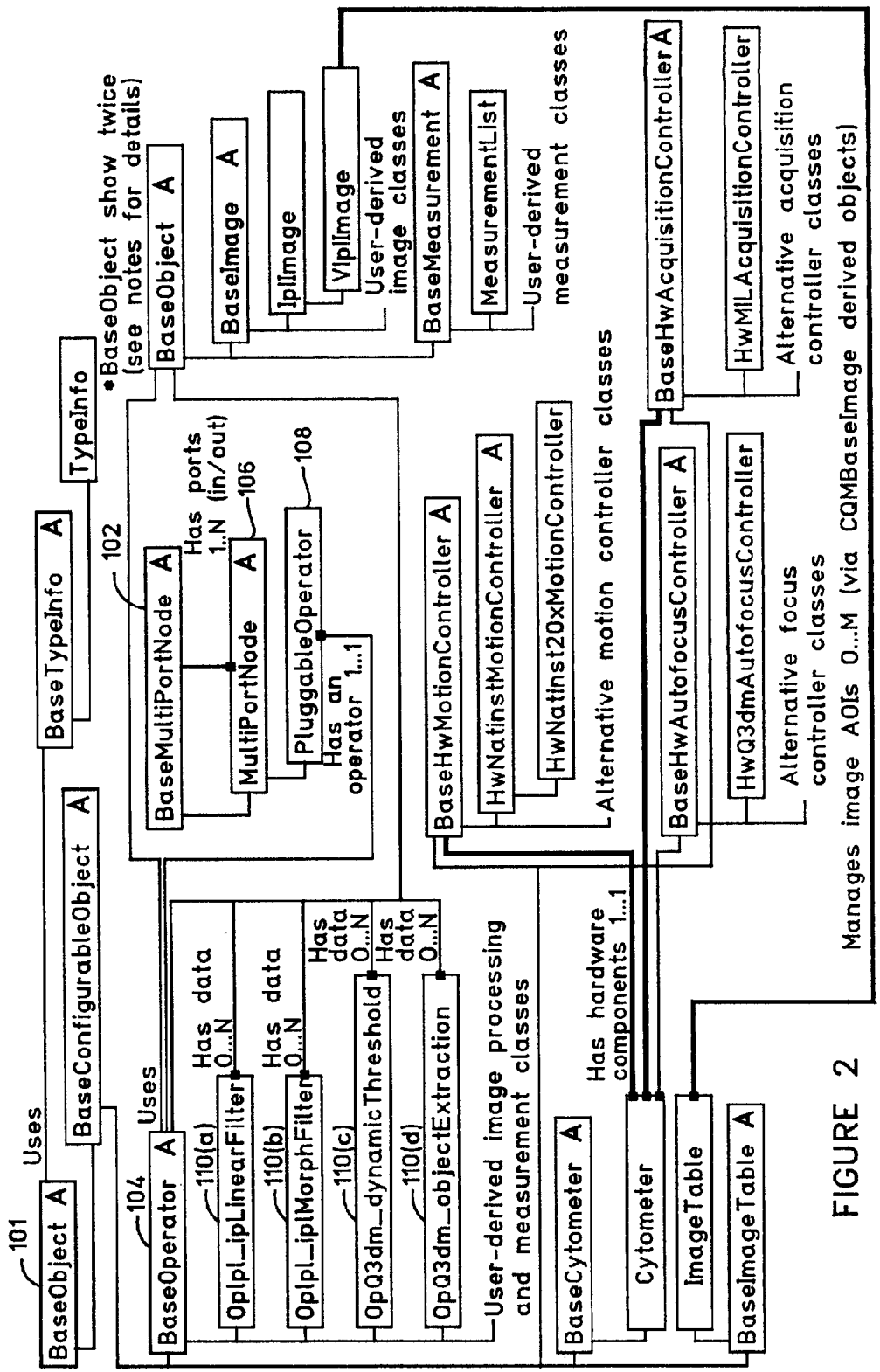
FIG. 2 is a pictorial representation of an extendible and dynamically reconfigurable processing architecture.

FIG. 2 is a pictorial representation of an extendible and dynamically reconfigurable processing architecture 100. The processing architecture 100 can be implemented as an object-oriented software program running in the processing unit 20 for processing image data. FIG. 2 illustrates generalization/inheritance (i.e. "is-a") and aggregation ("has-a") relationships among domain abstractions in an object-oriented embodiment of the architecture. In particular, base processing abstraction classes include a base multiport node 102 and a base operator 104. Processing abstractions are formed of the base abstractions and their derivatives. For instance, base operator derivatives provide image- or image-derived data processing and measurement operator classes, and base multiport node derivatives dynamically assemble the base operator objects into a functional processing system at runtime. The abstract base classes provide interfaces for object collaborations, and serve as a basis for user-customization of processing applications.

As illustrated in FIG. 2, all processing operations are derived from the base operator 104. In an exemplary embodiment, the base operator 104 is an abstract class implementing an API. In order to create a new processing operator, a new class is derived from the base operator 104, and override the appropriate virtual functions. The system only calls functions in the base operator API to accomplish processing tasks, and therefore the system is not dependent on additional functions (helper functions, etc.) added to the interface of these newly-derived classes.

An outline of the functionality and responsibilities for an implementation of base operator derived classes, or operator objects 110 is as follows. Each operator object 110 has N inputs and M outputs (also referred to as ports) and return these values through a series of functions for getting the number of respective ports. For each input and output port, the operator object 110 returns the type information for that port. To implement the algorithm functionality, the operator implementation overrides a base operator's virtual function, called processOperatorInputs( ), that processes the operator object inputs. All base operator objects are responsible for creating and managing the lifetime of their outputs, thus the operator object's 110 virtual destructor must free these output resources when the object is destroyed.

In a specific example, when the operator object 110 is constructed by the system, the following general interface protocols are established. When a function processOperatorInputs( ) is called, an array of pointers to n valid base object 101 objects is passed in through the apInput input parameter. An array that holds m pointers to base object 101 objects is passed in though the apOutput parameter—a processOperatorInputs( ) function is expected to copy the appropriate base object pointers into this array to represent the result of the operation for which it is responsible. For each input port, the type information does not generally change during the operator object's lifetime. Similarly, the operator object does not change the type information associated with its outputs. If an operator has either its connectivity to other processing nodes changed, or its configuration changed, it is possible that this could cause a change in the number of input/output ports and their associated types. Changes in the connectivity or the configuration of operators are not allowed in the midst of a processing cycle; thus, the number and types of the input/output ports should never change during a processing cycle.

The three classes, the base multiport node 102, multiport node 106 and pluggable operator 108 isolate the base operator 104 from dependencies within the structure of the system, while providing the interconnection and modular processing functionality. The pluggable operator 108 has a pointer to each base operator derived object 110. The pluggable operator 108 calls the operator class functions to determine the number of inputs and outputs, and their associated types. This information enables the pluggable operator 108 to create the input and output arrays, which contain the pointers to the base object class 101 objects. These arrays are used as parameters for an operator input processing function, to accomplish the associated image processing.

Based on the processing connectivity of the multiport nodes 106, the pluggable operator 108 calls the node's 106 predecessors to get references to the appropriate base object class 101 objects and then copies these references into the input array before calling the operator input processing function. Similarly, when the call to the operator inputs processing function returns to the pluggable operator 108, the results of the operation can then be passed to the node's ancestors from the output references in the same manner. The call direction is one way from the pluggable operator 108 to the base operator-derived operator object, and never the other way. The pluggable operator 108 calls functions of the operator objects 110 only through a base operator 104 abstract base class interface. The use of the base operator 104 as an abstract base class isolates the system from changes in implementations of the operator objects 110 derived from the base operator 104.

As illustrated by the class hierarchy shown in FIG. 2, the pluggable operator 108 is derived from the abstract base class multiport node 106. The multiport node 106 includes implementations necessary to support the plugging aspects for the interconnection of the operator ports between processing nodes. The multiport node 106 does not directly support the base operator objects 10, and has no dependencies on them. The pluggable operator 108 makes all calls to the operator object functions, and isolates the rest of the system from these calls and functions.

The multiport node 106 is derived from the base multiport node 102 class. The base multiport node 102 is a pure abstract interface without implementation code. In an exemplary embodiment, the base multiport node 102 forms an application programming interface (API). Since the system generally handles processing nodes through the base multiport node 102, changes to the partial implementation of multiport nodes 106 do not require recompilation of those components though this abstract interface.

After the API user has defined a new processing element to be derived from base operator 104 as an operator object 110, a maker function for the class must be implemented so that instances of the new object can be constructed and dynamically loaded by the system at runtime. Since object code for the new operator will be compiled after the processing application is compiled, it is not possible to directly link this newly defined operator object into the application. However, since the pluggable operator 108 operates on this new operator object though the base operator 104, it is not necessary for the system to know all of the details related to this specific operator object. If the system can get a valid base operator pointer from a dynamically created object derived from the base operator base class, this will enable the system to dynamically load the new object into the system, and the pluggable operator 108 can operate on it.

The maker function operates as follows in an exemplary embodiment. Within the same dynamic link library (DLL) defining the new operator, the API user also defines a standard C function that constructs this new operator and returns a pointer to it. For instance, if a new operator called CabcLinearFilter was derived from base operator 104, a standard C function returning a valid base operator pointer would suffice. For instance, a single statement can be used such as (new CabcLinearFilter).

Once a new base operator-derived operator object 110 has been defined along with the appropriate maker function, the system can construct the new operator object 110. The path to the DLL and the name of the maker function must be known. Conventional operating systems allow dynamical loading of libraries into a running process, such as, e.g. LoadLibrary( ), dlopen( ), etc. Once the library (module, shared object, etc.) is loaded by the process, the address of specific functions are then available though the function names, for example, GetProcAddress( ), dlsym( ), etc. After the system calls the maker function, it will have a valid base operator pointer for passing to the pluggable operator 108 object. These steps allow the system to dynamically load, create and connect a processing block that uses the functionality in this newly defined operator.

In more detail, and in accordance with an exemplary embodiment, the roles and responsibilities of the base abstract classes and derivatives follows.

Base Operator

The base operator 104 abstracts processing functionality of the application. The base operator 104 is an abstract base class whose primary responsibility is to provide a generalized interface so that processing functions done by operator objects, derived from the base operator, such as functions to provide a data source, filter, threshold, or data sink, etc. can be dealt with in a generic manner.

In an embodiment, the getSymbolicName( ) and setSymbolicName( ) are exemplary names that represent functions for assigning an arbitrary text label to the operator object for identification and description of the particular operator object. This text label may be something like "Edge detecting Linear Filter," and can be changed throughout the operator object's lifetime.

Operator Object

These classes are implementations that are subclassed from the base operator abstract class. There are several pure virtual functions not implemented by the base operator that must be implemented before the derived class can be instantiated, or actually created in an executable. One responsibility of an operator object is to create and manage its own outputs. In an example embodiment, other functions of the operator objects are:

getName( ): returns a label that describes the operator object. This label can be constant over the object's lifetime.

getNumOperatorInputs( ): defines how many inputs (images, measurement, etc) that the operator utilizes to accomplish its processing task(s). The number of inputs can be from 0 to n.

getInPortTypeInfo( ): for each of the inputs, describes the type with which they are compatible. For instance, if input port 0 says it requires a BaseImage type, a CQMIplImage can be provided at this port, since CQMIplImage is derived from BaseImage and therefore is compatible.

getNumOperatorOutputs( ): defines how many outputs (images, measurement, etc) that the operator will provide as output upon completion of its processing task(s). The number of inputs can be from 0 to n.

getOutPortTypeInfo( ): for each of the outputs, describes the type with which they are compatible. For instance, if output port 0 says it provides a BaseImage compatible type, a CQMIplImage can be provided at this port as CQMIplImage is derived from BaseImage (and is thus is compatible).

For configuration and persistence, the following functions can be used:

getConfigList( ): retrieves the current configuration parameters.

setConfigList( ): sets the current configuration parameters, assuming each parameter is valid.

validConfig( ): verifies whether the operator has a valid configuration.

reset( ): restores the default configuration.

restoreConfig( ): read from an istream to restore the configuration.

saveConfig( ): write to an ostream to save the configuration.

For pre- and post-processing, the following functions can be used:

initValidateInputsSetupOutputs( ): determines if the current configuration is valid for the operator. Creates valid output(s) based on the configuration and the inputs and return references to these valid output(s). This function merely has to create valid outputs, and does not have to do the actual processing done in the processOperatorInputs( ) function. Further, this function is generally called only once before the processOperatorInputs( ) function is called.

processOperatorInputs( ) performs the actual processing. In general, this function is called several times during a processing loop. For instance, when processing a 10 unit×10 unit image scan, each operator is called 100 times.

The general guarantee to the processing function is as follows:

An array of valid pointers to valid inputs is passed in via an array and these inputs are valid during the function call.

An array that can hold pointers for each of the outputs will be passed in as well. Upon successful completion of the processing done by this operator, references to the outputs (managed by this operator) are copied into this array before returning from this function. This is how the results of this operation are passed to the outside. The output references must remain valid until the next call to one of the following three functions (initValidateInputsSetupOutputs, processOperatorInputs or deinit), or when the operator object is destroyed.

deinit( ): when finished with processing, this function is called so the operator can finish up any other needed processing, free resources used in its processing, etc. This function is generally called only once after the calls to processOperatorInputs( ) are finished. Once this function is called, the initValidateInputsSetupOutputs function must be successfully called before the processOperatorInputs( ) function is called again.

Base Multiport Node

The base multiport node class abstracts the plugging together of and doing processing on, interconnected base multiport nodes. The base multiport node class is an abstract base class whose primary responsibility is to provide a generalized interface to isolate the system using it from the actual implementation details that support the behaviors provided. For instance, a user of the base multiport node class knows nothing about the object that does the actual processing (i.e. the actual operator object derived from the base operator).

Multiport Node

The multiport node abstract class implements the plugging together with other multiport nodes, which enables the multiport nodes to do their 'work' on their inputs. The multiport node class is derived from base multiport node, in part to isolate the base multiport node class from changes in the implementation of the algorithm. Since the pure virtual functions are not all implemented in the multiport node class, this class is still abstract, and thus cannot be directly instantiated.

In an example implementation, the multiport node includes the following functions. For initializing the input/output port count, the following functions can be used:

setNumInPorts( ): called by the pluggable operator subclass since only it knows about the BaseOperator::getNumOperatorInputs( ) function to get the information.

setNumOutPorts( ): called by the pluggable operator sub-class since only it knows about the BaseOperator::getNumOperatorOutputs( ) function to get the information.

For connectivity with other multiport nodes, the following functions can be used:

attachInPort( ): attaches a specified input port to a specific output port of another multiport node.

attachOutPort( ): attaches a specified input port to a specific output port of another multiport node.

validateConnectivityAtInPort( ): validates that a specific input port is connected to another multiport node.

validateConnectivityAtOutPort( ): validates that a specific output port is connected to another multiport node.

validateConnectivityForNode( ): validates connectivity for all input and output ports.

For getting input data for a multiport node from predecessor nodes:

getOutPortDataRef( ): for a specific output port, retrieves a reference (pointer) to output data that is owned and managed by a predecessor multiport node. The pluggable operator subclass calls the getOutPortDataRef function to get valid input data pointers so that it can call this output data from a predecessor multiport node is used by the pluggable operator class to pass input data into the BaseOperator::processOperatorInputs( ) function.

Pluggable Operator

The pluggable operator class is derived from multiport node class, and is a fully implemented class—it can be instantiated. Of the three classes discussed in the multiport node class hierarchy, the pluggable operator class is the only class that knows about the base operator class, and which operations are held by the base operator class to accomplish the actual processing done by the multiport nodes that are connected together.

The pluggable operator implements many of the pure virtual functions in the base multiport node interface by forwarding calls to a member function of the operator object that it holds. For example, the pure virtual member function in the base multiport node interface is implemented by the pluggable operator class. The PluggableOperator::doIt( ) function ultimately calls the virtual BaseOperator::processOperatorInputs( ) member function to do the processing work. In one embodiment, the virtual processOperatorInputs( ) function can be implemented by the class derived from the base operator class.

The initializing, processing and de-initializing functions of the pluggable operator include:

getOutPortDataRef( ): for a specific output port, retrieves a reference (pointer) to output data that is owned and managed by a predecessor multiport node. The pluggable operator calls a getOutPortDataRef function to get valid input data pointers so that it can call the output data from a predecessor multiport node. This pointer is used by the pluggable operator to pass input data into the BaseOperator::processOperatorInputs( ) function.

The configuration and persistence functions, which can include calls forwarded to the base operator object managed by the pluggable operator are:

getConfigList( ): retrieves the current configuration parameters by forwarding call to the base operator object it manages.

setConfigList( ): sets the current configuration parameters (assuming parameter(s) are valid) by forwarding call to the base operator object it manages.

validConfig( ): determines whether the operator currently has a valid configuration by forwarding call to the base operator object it manages.

reset( ): restore a default configuration by forwarding the call to the base operator object it manages.

restoreConfig( ): this function reads from an istream to restore the configuration by forwarding call to the base operator object it manages.

saveConfig( ): this function writes to an ostream to save the configuration by forwarding call to the base operator object it manages.

For pre- and post-processing, including calls forwarded to the base operator object managed by the pluggable operator:

initValidateSetup( ): determines if the current configuration and input parameters are valid for the operator managed by the pluggable operator, validates each of the inputs passed in, creates valid output(s) based on the configuration and the inputs and return references to these valid output(s). Once the input/output arrays are set up and initialized, the function calls the BaseOperator::initValidateInputsSetupOutputs( ) to do the work. Upon returning from the initValidateInputsSetupOutputs( ) function, the pluggable operator can save references to the valid output objects so that the multiport nodes connected to this node's outputs can get valid inputs when their initValidateSetup( ) function is called.

doIt( ): performs the actual processing. This processing is accomplished by forwarding the call to base operator object it manages. After some setup of the input and output arrays, the function BaseOperator::processOperatorInputs( ) is called to do the actual processing work.

deinit( ): when finished with processing, this function is called on the base operator managed by this pluggable operator so that operator object can finish any final processing, free resources used in its processing, etc. This is done by forwarding the call to the BaseOperator::deinit( ) function. Once this function is called, the PluggableOperator::initValidateSetup( ) function must be successfully called before the doIt( ) function is called again.

Figure 3:
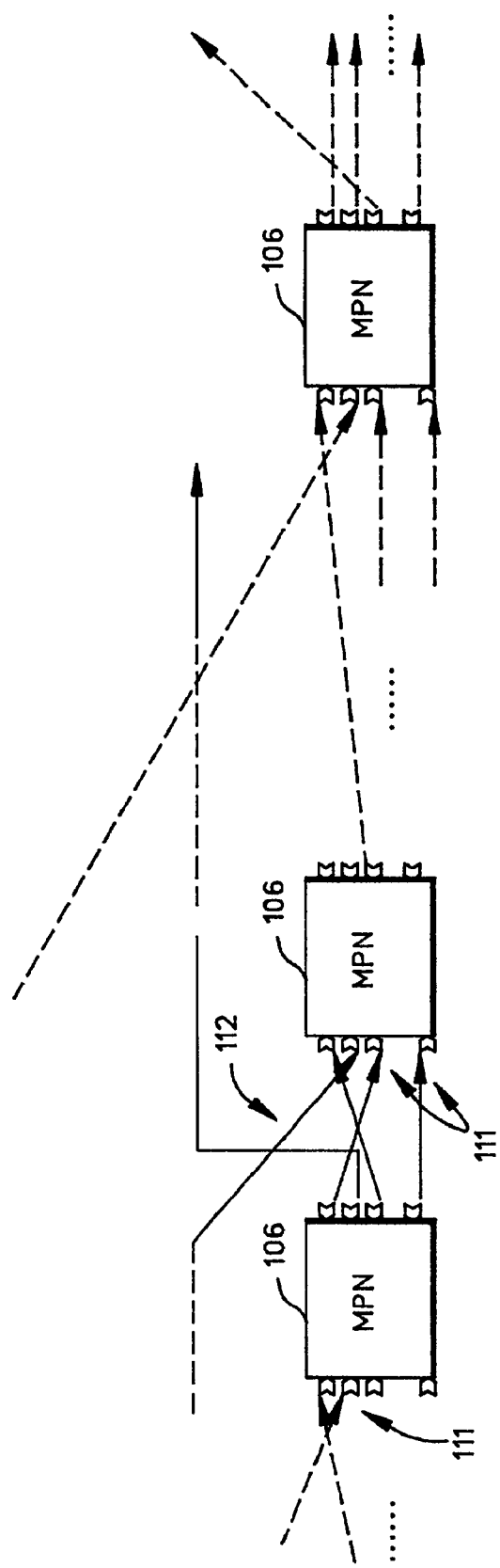
FIG. 3 is a schematic diagram of interconnected multiport nodes.

FIG. 3 is a schematic diagram of interconnected multiport nodes 106. Each multiport node 106 has N input ports 111 and M output ports 112. The multiport nodes 106, derived from the base multiport node class, implement the connectivity from outputs 112 of one or more multiport nodes 106 to inputs 111 of one or more other multiport nodes 106. The connectivity defines the functionality of an image processing application, and supports pluggability of one functional node to another. A pluggable operator, derived from the multiport node 106, supports the actual processing performed by the interconnected multiport nodes 106 via operator objects 110.

Figure 4:
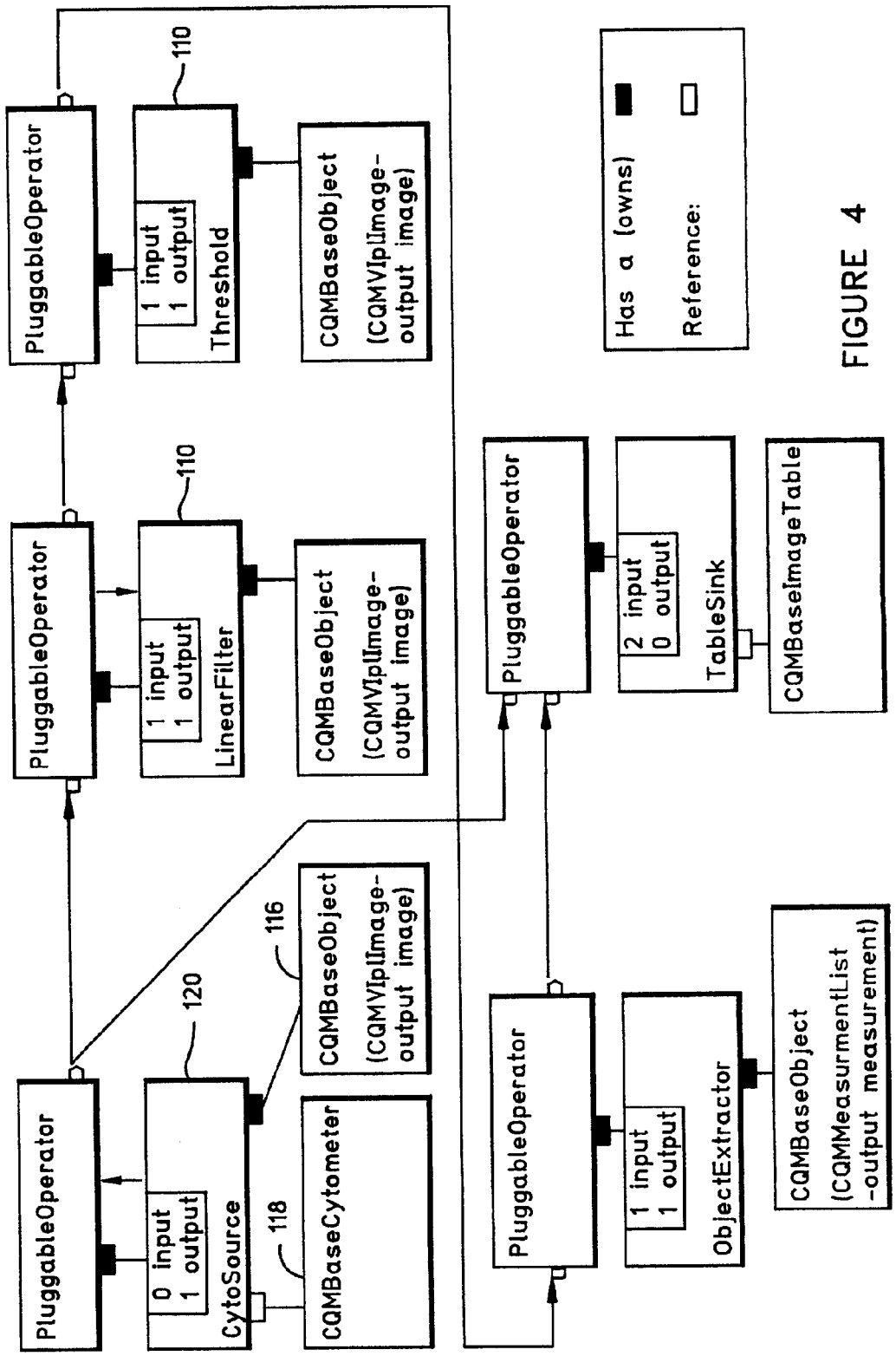
FIG. 4 is a block diagram of a processing architecture to illustrate a functional flow of an implementation of one algorithm, in accordance with an embodiment of the invention.

FIG. 4 is a block diagram of a processing architecture to illustrate a functional flow of an implementation of one algorithm, in accordance with an embodiment of the invention. In the embodiment, images are obtained from a cytometer 118 by a source multiport node 120. The processing architecture then performs image processing functions and extracts sub portions of the original image so that areas of interest (AOI) can be inserted into an image table for archival storage.

The directed arrows illustrate the connectivity between the output and input ports of the multiport nodes. The input ports are shown on the left side of the box labeled "pluggable operator," and the output ports are shown on the right side of the box. The interconnectivity of the multiport nodes is supported by the multiport node class hierarchy. The boxes directly below the pluggable operators are operator objects 110 that are derived from the base operator. The solid connector signifies that the pluggable operator owns the operator object. The operator objects are configured to manage their own outputs. Thus, the image/measurement output objects are connected by a line with a solid connector. Some of the operator objects may not own objects that they use, and are indicated by a hollow connector.

Figure 5:
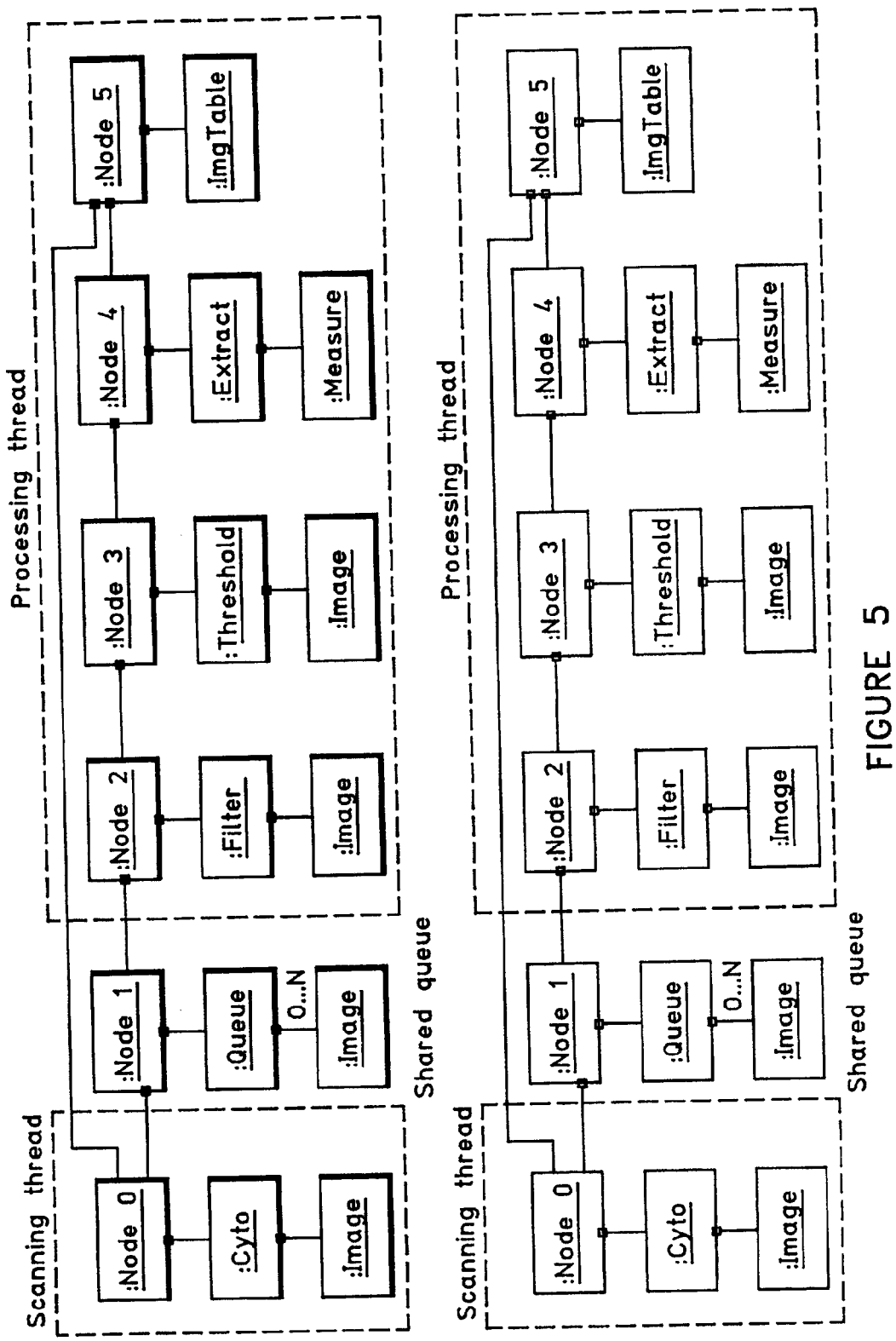
FIGS. 5 and 6 show specific examples of a processing application configured in accordance with an plug-in architecture of an embodiment of the invention.
Figure 6:
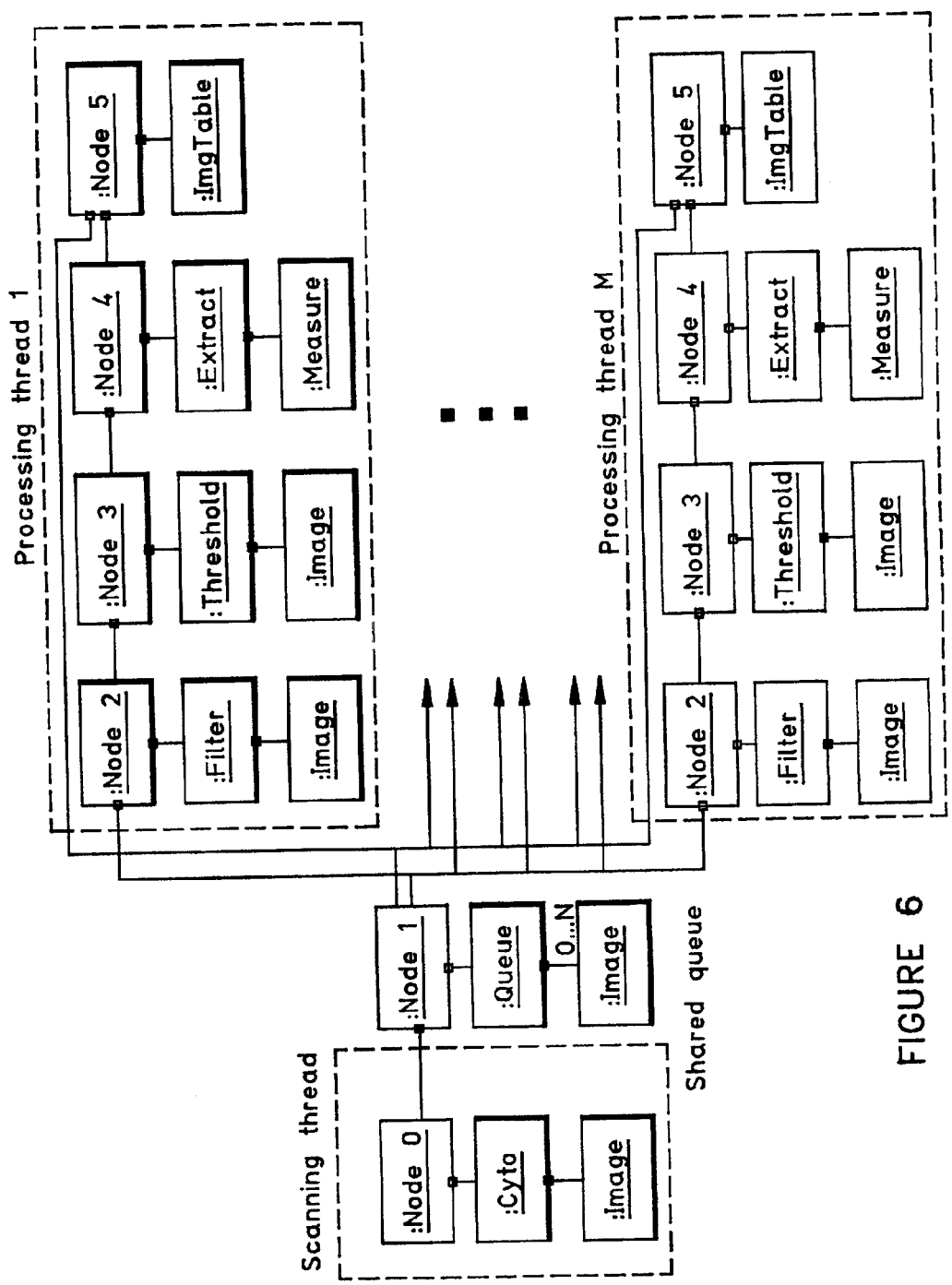

FIGS. 5 and 6 show specific examples of a processing application configured in accordance with an plug-in architecture of an embodiment of the invention. Other configurations are possible. FIG. 5 shows a plurality of multiport nodes connected together to accomplish a specific set of operator object functions. In the example, image data is provided by a cytometer microscopy imaging platform. Each multiport node, labeled as such, is related to an operator object such as "queue," "filter," and so on. The multiport nodes are connected together such that execution of all of the operator objects accomplishes a desired application. FIG. 6 demonstrates a system in which the same application shown in FIG. 5 can be used for processing multiple threads of image- or image-derived data, such as when multiple scans of the same images are performed.

Although the above disclosure is applicable to biological specimens, the disclosure can be applied to processing images of non-biological specimens. For instance, the specimens can be semiconductor wafer and/or integrated circuits. Accordingly, the disclosure can be useful for inspection of integrated circuits and other solid state applications.

Other embodiments, combinations and modifications of this invention will occur readily to those of ordinary skill in the art in view of these teachings.

Therefore, this invention is to be limited only by the following claims, which include all such embodiments and modifications when viewed in conjunction with the above specification and accompanying drawings.

What is claimed is:

1. A computer-implemented system for assembling an application for processing image or image-derived data, comprising:

a base operator configured to interface with one or more derivative operator classes, each operator class including an operator object for executing a processing function on the image or image-derived data; and a base multiport node class configured to provide a multiport node for each operator object, each multiport node instantiating a pluggable operator for connecting the multiport nodes together at runtime according to user-defined parameters, and wherein the connection of multiport nodes implements the processing functions of the operator objects to execute the application.

2. The system of claim 1, wherein each multiport node includes N inputs and M outputs, each input and output having a connection with at least one other multiport node.

3. The system of claim 1, wherein the pluggable operator includes a pointer to an operator object.

4. The system of claim 1, wherein the pluggable operator is an class derived from the multiport node.

5. The system of claim 3, wherein the pluggable operator is configured to call the operator object.

6. The system of claim 3, wherein the pointer is based on the user-defined parameters.

7. The system of claim 6, wherein the user-defined parameters are dynamically definable at run time of the application.

8. The system of claim 7, wherein the pluggable operator is configured to adapt the pointer array to changes in the user-defined parameters.

9. The system of claim 8, wherein each multiport node is configured to adapt to changes in the pointer array.

10. The system of claim 9, wherein the base operator interface is configured to enable more or less operator classes at runtime.

11. A computer-implemented method of assembling an application for processing image or image-derived data, comprising:

providing a base operator having an interface for interacting with one or more derivative operator classes, each operator class including an operator object for executing a processing function on the image or image-derived data;

providing a base multiport node configured to provide a multiport node for each interacting operator object; and connecting the multiport nodes with a pluggable operator instantiated by each multiport node.

12. The method of claim 1 wherein the pluggable operator includes a pointer to an operator object.

13. The method of claim 12, wherein the pointer is configured according to a set of user-defined parameters specified by the base operator.

14. The method of claim 11, wherein the connection of the multiport nodes defines the application.

15. The method of claim 14, further comprising receiving user-defined parameters at runtime of the application.

16. The method of claim 13, further comprising reconfiguring the connections of the multiport nodes according to user defined parameters received at runtime of the application.

17. The method of claim 12, wherein connecting the multiport nodes is based on the user-defined parameters.

18. The method of claim 1 wherein each multiport node includes N inputs and M outputs.

19. The method of claim 18, wherein each input and output of each multiport node is connected to at least one other multiport node.

20. The method of claim 11, further comprising reconfiguring the application with at least one new operator object at runtime of the application.

* * * * *